Figure 1:
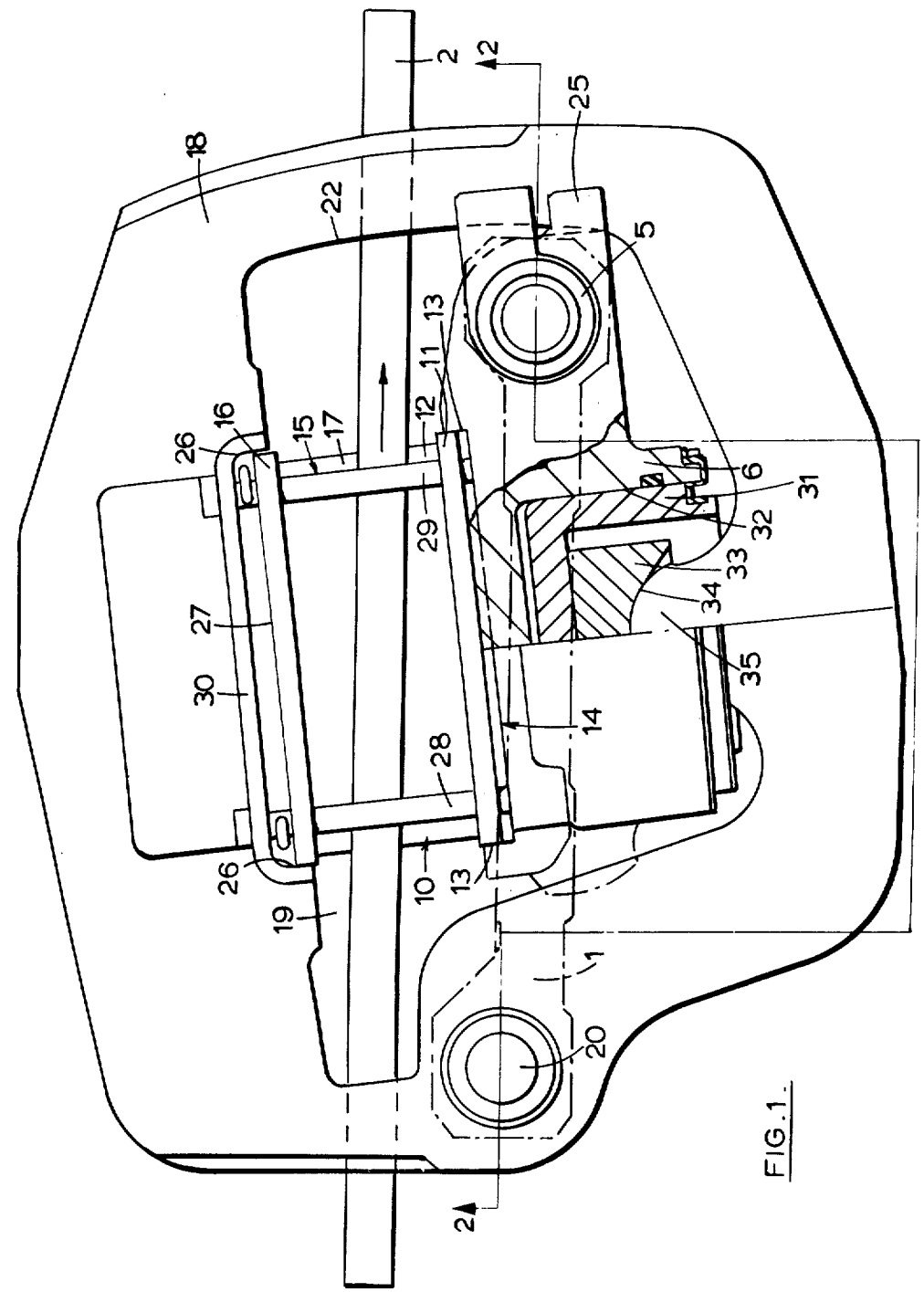

United States Patent [19]
Margetts

[11] 3,935,928
[45] Feb. 3, 1976

[54] PIVOTABLE CLOSED LOOP TYPE DISC BRAKE

[75] Inventor: Hugh Grenville Margetts, Leamington Spa, England

[73] Assignee: Girling Limited, Birmingham, England

[22] Filed: June 27, 1974

[21] Appl. No.: 483,811

[30] Foreign Application Priority Data
June 27, 1973 United Kingdom............ 30570/73

[52] U.S. Cl. ............................................. 188/73.4
[51] Int. Cl.[2] ........................................ F16D 65/20
[58] Field of Search............................ 188/73.4, 72.2

[56] References Cited
UNITED STATES PATENTS

| | | | |
|---|---|---|---|
| 3,199,632 | 8/1965 | Chouings........................ | 188/73.4 |
| 3,199,634 | 8/1965 | Chouings........................ | 188/73.4 |
| 3,455,417 | 7/1969 | Takata............................. | 188/73.4 |
| 3,712,422 | 1/1973 | Harikawa et al................. | 188/73.4 |

FOREIGN PATENTS OR APPLICATIONS

| | | | |
|---|---|---|---|
| 968,897 | 9/1964 | United Kingdom............. | 188/73.4 |
| 1,331,797 | 5/1963 | France........................... | 188/73.4 |

*Primary Examiner*—Trygve M. Blix
*Assistant Examiner*—Edward R. Kazenske
*Attorney, Agent, or Firm*—Scrivener Parker Scrivener and Clarke

[57] ABSTRACT

In a brake of the single sided-reaction type friction members for engagement with opposite faces of a rotatable braking member are carried by a caliper or yoke and by an arm which are independently mounted for angular movement about separate pivots both lying adjacent to the face of the disc with which the friction member carried by the arm is engagable, and the friction members are applied to the braking member by an hydraulic piston working in a cylinder bore in the arm and acting directly on the caliper or yoke.

3 Claims, 2 Drawing Figures

PIVOTABLE CLOSED LOOP TYPE DISC BRAKE

This invention relates to improvements in brakes for vehicles of the kind in which friction members are adapted to be brought into engagement with opposed braking surfaces of a rotatable braking member, such as a disc or the flange of a drum, and the friction members are carried by separate members independently mounted for angular movement about separate pivots of which the pivots lie adjacent to one braking surface, the pivots being spaced circumferentially relative to the axis of the rotatable braking member and being constructed and arranged so that, when the brake is applied with the rotatable braking member rotating in its normal forward direction, the drag on the friction members produces a self-energising or servo effect to increase the force with which they are applied to the rotatable braking member, one of the members carrying a friction member for engagement with one braking surface comprising an arm mounted for angular movement about a pivot adjacent to that braking surface, and the other member carrying the other friction member for engagement with the other braking surface comprising a caliper or yoke which extends over the peripheral edge of the rotatable braking member, an hydraulic actuator acting between the arm and the caliper or yoke to apply the friction members to the rotatable braking member.

In one known brake of the kind set forth the hydraulic actuator comprises an hydraulic piston acting on the arm and working in a cylinder bore in the caliper or yoke. In such a construction the friction member carried by the arm is applied directly to the braking member by the piston and the other friction member is applied to the disc indirectly by the reaction on the caliper or yoke. In such a construction since the hydraulic actuator is provided within the caliper or yoke, in order to install the brake, the pivots have to be spaced from the braking member by a substantial distance. Although this has the advantage that the angle between the plane of the braking member and a line passing through the centre of pressure of a friction member and the pivot about which it is angularly movable is substantial and, as a consequence, the self-energising or servo-effect, excessive brake judder may be experienced and the members of the brake may be subjected to large deflections.

According to our present invention, in a brake of the kind set forth in vehicles the hydraulic actuator comprises an hydraulic piston working in a cylinder bore in the arm and acting directly on the caliper or yoke. Thus the friction member carried by the caliper or yoke is applied to the opposite side of the braking member by the force from the piston, and the other friction member carried by the arm is applied to the adjacent face of the braking member by the reaction on the arm.

This has the advantage that the pivots can be located closer to the disc. Although the selfenergising or servo-effect will be reduced, nevertheless such an arrangement has the advantage that excessive brake judder can be avoided and also deflection of the members at the brake can be reduced.

Preferably the friction members are tapered in thickness, the tapering being in a direction such that the backs of the friction members are initially parallel though at an angle to the braking member and they will remain parallel if the friction members wear at equal rates. This has the advantage that the friction members can be retained in the brake against movement in a radial direction by common pins extending over the peripheral edge of the braking member.

Preferably the pivots comprise pins which are received in a drag-taking member adapted to be secured to a fixed part adjacent to the said one braking surface. Conveniently the pins are parallel to each other and to the said one braking surface.

Figure 2:
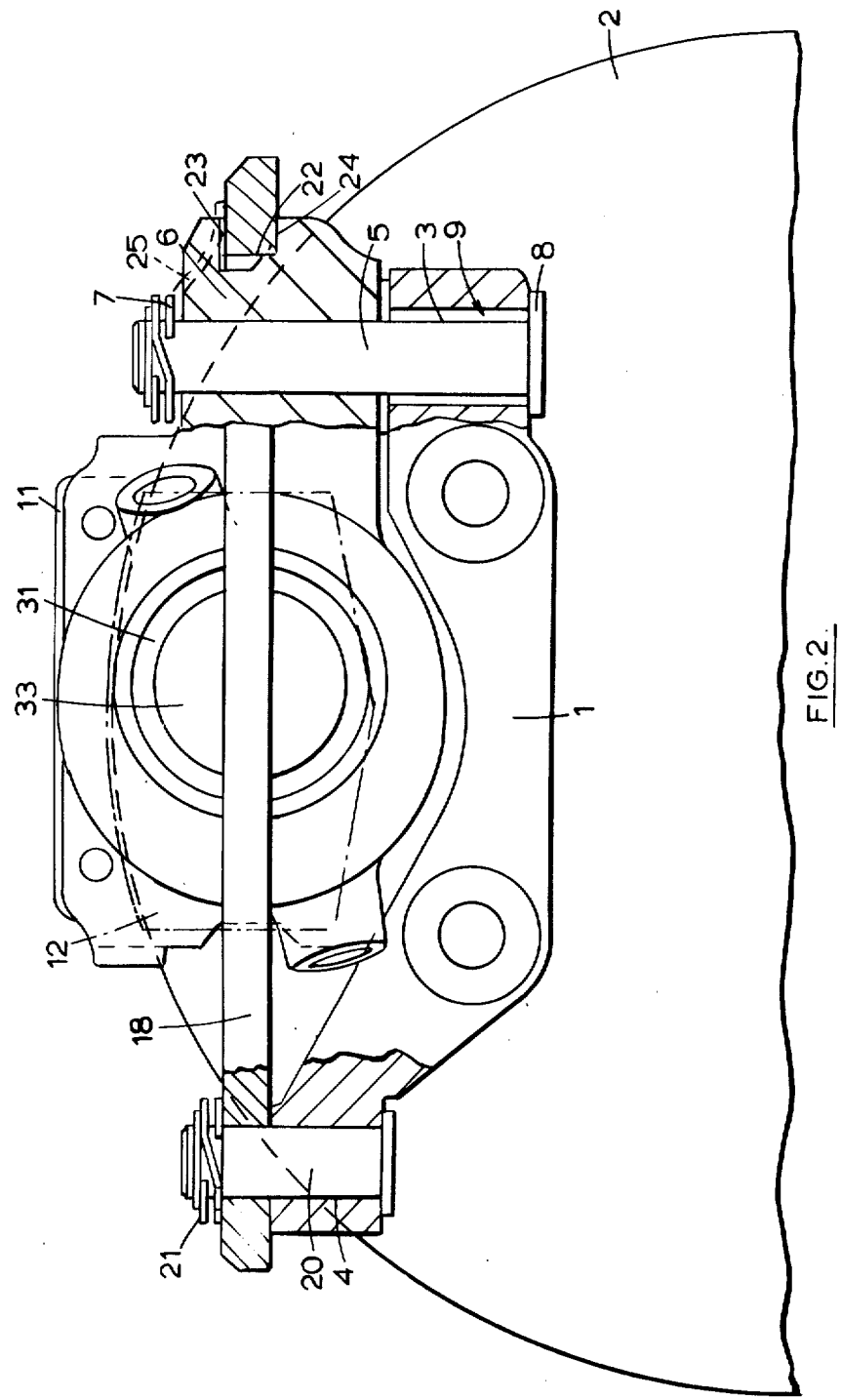

One embodiment of our invention is illustrated in the accompanying drawings in which:

FIG. 1 is a plan view of an hydraulicallyoperated disc brake including a section through part of the actuator; and FIG. 2 is an end elevation along the axis of the disc including a section substantially on the line 2—2 of FIG. 1.

In the hydraulically-operated disc brake illustrated in the drawings a stationary drag-taking member 1 of shallow U outline is secured to a fixed part adjacent to one face of a rotatable disc 2. Circumferentially spaced parallel openings 3 and 4 parallel and chordal with respect to the disc are provided on opposite ends of the stationary member 1. The opening 3 receives a headed pin 5 forming a pivotal connection with the outer end of an arm 6 which extends circumferentially towards the opening 4. The arm 6 is urged by means of a spring washer 7 into engagement with a flange 8 at the adjacent end of a bushing 9 in which the pin is journalled for rotation.

A first friction pad assembly 10 comprises a rigid backing plate 11 carrying a friction pad 12 of tapered outline adapted to engage the face of the disc adjacent to the stationary member 1. Opposite ends of the backing plate 11 engage with opposite end faces 13 of a recess 14 in the arm in which the backing plate 11 is received with a portion of the pad 12 which is of greatest thickness being located adjacent to the end of the recess 14 remote from the pin 5.

A second friction pad assembly 15 comprises a rigid backing plate 16 carrying the friction pad 17 of tapered outline for engagement with the opposite face of the disc 2. The friction pad 17 is tapered in a direction opposite to that of the pad 12 so that the backing plates 11 and 16 are parallel.

The second friction pad assembly 15 is carried by a caliper or yoke 18 comprising a metal pressing which extends over the peripheral edge of the disc and is provided with a central aperture 19 of substantial dimensions. The caliper or yoke 18 is connected to the upper end of a headed pin 20 which is located in the opening 4 in the stationary member 1 with the caliper or yoke 18 being urged against the stationary member 1 by means of a spring washer 21.

A portion 22 of the edge of the aperture 19 at a point substantially opposite the pin 20 is of arcuate outline and is received within a notch 23 at the outer end of the arm 6. The provision of the arcuate portion 22 enables the arm 6 and the caliper or yoke 18 to move angularly about the pins 5 and 20 with respect to each other in opposite directions. The notch 23 is of a depth slightly greater than the thickness of the caliper or yoke 18 and the caliper or yoke 18 is resiliently urged into engagement with the lower face 24 of the notch 23 by means of a resilient finger 25 integral with the spring washer 7. This resists any tendency for the caliper or yoke 18 to move radially with respect to the stationary member 1.

Opposite ends of the backing plate 16 engage with end faces 26 at opposite ends of a recess 27 in the caliper or yoke 18 in which the backing plate 16 is received. The backing plates 16 and 11 are connected by circumferentially spaced pins 28 and 29 which also pass through aligned openings in a flange 30 which is outstanding from the plane of the caliper or yoke 18. The pins 28 and 29 retain the friction pad assemblies 10 and 15 against movement with respect to the brake in a radial direction.

The friction pad assemblies 10 and 15 are adapted to be applied to opposite faces of the disc 2 by means of an hydraulic actuator comprising a cup-shaped hollow piston 31 working in an outwardly directed cylinder bore 32 in the arm with the closed end of the piston adjacent to the inner closed end of the bore 32. The hollow interior of the piston 31 accommodates a thrust block 33 having at least a circumferential dimension less than the diameter of the outer end of the piston 31. A concave recess 34 in the outer end of the thrust block 33 receives a corresponding tongue 35 on the caliper or yoke 18 which is of complementary convex outline.

When the hydraulic actuator is pressurised, the piston 31 acts on the caliper or yoke 18 through the thrust block 33 to urge the friction pad assembly 15 into engagement with the face of the disc 2 remote from the stationary member 1. The reaction on the cylinder bore 32 moves the arm 6 in the opposite direction to urge the friction pad assembly 10 into engagement with the face of the disc 2 adjacent to the stationary member. Thus, the arms 6 and the caliper or yoke 18 move about the pins 8 and 20 in opposite directions and this relative movement is accommodated by relative sliding between the block 33 and the piston, and a rocking or sliding engagement between the tongue 35 and the recess 34 in the thrust block 33.

When the disc is rotating in a normal forward direction as illustrated by the arrow in FIG. 1 of the drawings, when the brake is applied, frictional engagement between the pads 12 and 17 and the disc 2 causes the arm 6 and the caliper or yoke 18 to swing inwardly about the pins 5 and 20 towards the disc 2 to give a servo or self-energising action and so increase the force with which the pads are applied to the disc. The drag on the friction pad assemblies 10 and 15 is taken by the faces 13 and 26 at the inner ends of the recesses 14 and 28 and is transferred to the stationary member 1 through the arm 6 and the pin 8, and through the caliper or yoke 18 and the pin 20. Thus, the transmission of the drag forces to the stationary member 1 enhances the force with which the friction pad assemblies 10 and 15 are applied to the disc 2.

I claim:

1. A brake for a vehicle comprising a rotatable braking member, opposite faces of said braking member defining opposed braking surfaces, first and second friction members for engagement with said braking surfaces, support members carrying said friction members, separate pivots lying adjacent to one of said braking surfaces and about which said support members are independently mounted for angular movement, said pivots being spaced circumferentially relative to the axis of said braking member and being so constructed and arranged that the drag on said friction members produces a self-energising effect to increase the force with which said friction members are applied to said braking member, wherein said support member carrying said first friction member for engagement with said one braking surface comprises an arm, said support member carrying said second friction member comprises a yoke which extends over said rotatable braking member, and an hydraulic actuator acts between said arm and said yoke to apply said friction members to said rotatable braking member, said hydraulic actuator comprising an hydraulic piston acting directly on said yoke and working in a cylinder bore in said arm, and wherein said pivots comprise spaced parallel pins received in a drag-taking member adjacent to the said one braking surface, and said piston has an outwardly directed hollow interior in which is slidably accommodated a thrust block having at least a circumferential dimension less than the dimension at the interior of the piston and an outwardly directed concave recess in which is received in rocking and sliding engagement a tongue on said yoke.

2. A brake for a vehicle comprising a rotatable braking member, opposite faces of said braking member defining opposed braking surfaces, first and second friction members for engagement with said braking surfaces, support members carrying said friction members, separate pivots lying adjacent to one of said braking surfaces and about which said support members are independently mounted for angular movement, said pivots being spaced circumferentially relative to the axis of said braking member and being so constructed and arranged that the drag on said first members produces a self-energising effect to increase the force with which said friction members are applied to said braking member, wherein said support member carrying said first friction member for engagement with said one braking surface comprises an arm, said support member carrying said second friction member comprises a yoke which extends over said rotatable braking member, and an hydraulic actuator acts between said arm and said yoke to apply said friction members to said rotatable braking member, said hydraulic actuator comprising an hydraulic piston acting directly on said yoke and working in a cylinder bore in said arm, and wherein said yoke is provided with a central aperture of which a portion at the edge of the aperture at a point substantially opposite the pivot for said yoke is of arcuate outline and is received within a notch at the outer end of said arm remote from said friction member carried by said arm.

3. A brake for a vehicle comprising a rotatable braking member, opposite faces of said braking member defining opposed braking surfaces, first and second friction members for engagement with said braking surfaces, support members carrying said friction members, separate pivots lying adjacent to one of said braking surfaces and about which said support members are independently mounted for angular movement, said pivots being spaced circumferentially relative to the axis of said braking member and being so constructed and arranged that the drag on said friction members produces a self-energising effect to increase the force with which said friction members are applied to said braking member, wherein said support member carrying said first friction member for engagement with said one braking surface comprises an arm, said support member carrying said second friction member comprises a yoke which extends over said rotatable braking member, and an hydraulic actuator acts between said arm and said yoke to apply said friction members to said rotatable braking member, said hydraulic actuator comprising an hydraulic piston working in a cylinder bore in said arm and a thrust block through which said piston acts on said yoke, said thrust block having a flat face for sliding engagement with said piston and an opposed concave face, said yoke including a part having rocking engagement with said concave face of said thrust block.

* * * * *